US010655580B2

(12) United States Patent
Usui et al.

(10) Patent No.: US 10,655,580 B2
(45) Date of Patent: May 19, 2020

(54) HIGH PRESSURE FUEL SUPPLY PUMP

(71) Applicant: Hitachi Automotive Systems, Ltd., Hitachinaka-shi, Ibaraki (JP)

(72) Inventors: Satoshi Usui, Hitachinaka (JP); Minoru Hashida, Hitachinaka (JP); Masayuki Suganami, Hitachinaka (JP); Hiroyuki Yamada, Hitachinaka (JP); Atsushi Hohkita, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 15/515,910

(22) PCT Filed: Sep. 4, 2015

(86) PCT No.: PCT/JP2015/075150
§ 371 (c)(1),
(2) Date: Mar. 30, 2017

(87) PCT Pub. No.: WO2016/056333
PCT Pub. Date: Apr. 14, 2016

(65) Prior Publication Data
US 2017/0306905 A1    Oct. 26, 2017

(30) Foreign Application Priority Data

Oct. 9, 2014  (JP) .................................. 2014-207888

(51) Int. Cl.
*F02M 37/00* (2006.01)
*F02M 59/46* (2006.01)
(Continued)

(52) U.S. Cl.
CPC ........ *F02M 37/0041* (2013.01); *F02M 37/00* (2013.01); *F02M 55/04* (2013.01);
(Continued)

(58) Field of Classification Search
CPC .. F02M 37/0041; F02M 59/36; F02M 59/464; F02M 59/466; F02M 59/366;
(Continued)

(56) References Cited

U.S. PATENT DOCUMENTS 4,118,156 A   10/1978 Ivosevic
4,409,939 A   10/1983 Eheim et al.
(Continued)

FOREIGN PATENT DOCUMENTS

EP    0 911 512 A2    4/1999
EP    0 962 655 A2    12/1999
(Continued)

OTHER PUBLICATIONS

Japanese-language Office Action issued in counterpart Japanese Application No. 2016-552866 dated Sep. 19, 2017 with English translation (Ten (10) pages).
(Continued)

*Primary Examiner* — Xiao En Mo
(74) *Attorney, Agent, or Firm* — Crowell & Moring LLP

(57) ABSTRACT

An object of the present invention is to obtain a high pressure fuel supply pump capable of reducing pressure pulsation that occurs in a low pressure pipe, preventing damage to the low pressure pipe, or reducing noise due to vibrations of the low pressure pipe. The present invention provides a high pressure fuel supply pump of a type in which, from a fuel suction port connected to a low pressure pipe provided upstream of a fuel, a low pressure passage, an electromagnetic suction valve driven by an electromagnetic force, a pressurizing chamber in which the volume thereof is increased or reduced by a plunger that is reciprocatingly moved by being guided by a cylinder, and a discharge valve provided at an outlet of the pressurizing chamber are sequentially arranged, a fuel is sucked to the pressurizing
(Continued)

chamber through the electromagnetic suction valve, the amount of a part of the fuel, which is sucked to the pressurizing chamber, to be returned to the low pressure passage side is adjusted so that the amount of the fuel to be discharged through the discharge valve is controlled, and the high pressure fuel supply pump includes a backflow suppression mechanism for suppressing backflow of fuel from the fuel from the fuel suction portion to the low pressure pipe side.

10 Claims, 10 Drawing Sheets

(51) Int. Cl.
  *F02M 59/02* (2006.01)
  *F02M 59/36* (2006.01)
  *F02M 59/10* (2006.01)
  *F02M 55/04* (2006.01)
  *F02M 59/44* (2006.01)
  *F04B 49/22* (2006.01)
  *F04B 49/24* (2006.01)
  *F16K 31/06* (2006.01)
  *F02M 63/02* (2006.01)
  *F04B 11/00* (2006.01)

(52) U.S. Cl.
  CPC ........ *F02M 59/027* (2013.01); *F02M 59/102* (2013.01); *F02M 59/36* (2013.01); *F02M 59/366* (2013.01); *F02M 59/44* (2013.01); *F02M 59/46* (2013.01); *F02M 59/464* (2013.01); *F02M 59/466* (2013.01); *F04B 49/225* (2013.01); *F04B 49/243* (2013.01); *F16K 31/06* (2013.01); *F02M 59/442* (2013.01); *F02M 63/0225* (2013.01); *F02M 2200/09* (2013.01); *F02M 2200/315* (2013.01); *F04B 11/0033* (2013.01)

(58) Field of Classification Search
  CPC .... F02M 59/102; F02M 59/027; F02M 55/04; F02M 59/44; F02M 37/00; F02M 59/46; F02M 63/0225; F02M 2200/31; F02M 2200/09; F04B 49/243; F04B 49/225; F04B 11/0033; F16K 31/06
  See application file for complete search history.

(56) References Cited

U.S. PATENT DOCUMENTS

| | | | |
|---|---|---|---|
| 6,053,712 A | 4/2000 | Konishi et al. | |
| 9,429,124 B2* | 8/2016 | Pursifull | F02M 63/0001 |
| 2003/0164161 A1 | 9/2003 | Usui et al. | |
| 2007/0110603 A1 | 5/2007 | Usui et al. | |
| 2009/0065292 A1* | 3/2009 | Beardmore | F02M 59/102 181/175 |
| 2010/0101538 A1* | 4/2010 | Beardmore | F02M 59/102 123/495 |
| 2012/0227711 A1 | 9/2012 | Saito | |
| 2012/0312278 A1 | 12/2012 | Usui et al. | |

FOREIGN PATENT DOCUMENTS

| | | |
|---|---|---|
| EP | 2 273 115 A1 | 1/2011 |
| JP | 53-58808 A | 5/1978 |
| JP | 58-58862 U | 4/1983 |
| JP | 58-67556 U | 5/1983 |
| JP | 59-150978 U | 10/1984 |
| JP | 4-209962 A | 7/1992 |
| JP | 7-103138 A | 4/1995 |
| JP | 11-132131 A | 5/1999 |
| JP | 2000-54961 A | 2/2000 |
| JP | 3326909 B2 | 9/2002 |
| JP | 3823060 B2 | 9/2006 |
| JP | 2007-16699 A | 1/2007 |
| JP | 2007-138762 A | 6/2007 |
| JP | 2007-218213 A | 8/2007 |
| JP | 2008-2361 A | 1/2008 |
| JP | 2010-216465 A | 9/2010 |
| JP | 2011-32870 A | 2/2011 |
| JP | 2011-179319 A | 9/2011 |
| JP | 2011-251694 A | 12/2011 |
| JP | 2012-127359 A | 7/2012 |
| JP | 2012-184745 A | 9/2012 |
| JP | 2013-36431 A | 2/2013 |
| JP | 2015-63921 A | 4/2015 |

OTHER PUBLICATIONS

Japanese-language Office Action issued in counterpart Japanese Application No. 2016-552866 dated May 8, 2018 with unverified English translation (nine pgaes).
Extended European Search Report issued in counterpart European Application No. 15849316.3 dated Mar. 20, 2018 (seven pages).
International Search Report (PCT/ISA/210) issued in PCT Application No. PCT/JP2015/075150 dated Dec. 22, 2015 with English translation (five (5) pages).
Japanese-language Written Opinion (PCT/ISA/237) issued in PCT Application No. PCT/JP2015/075150 dated Dec. 22, 2015 (six (6) pages).
European Office Action issued in counterpart European Application No. 15 849 316.3 dated Nov. 23, 2018 (five (5) pages).
Japanese-language Office Action issued in counterpart Japanese Application No. 2016-552866 dated Jun. 25, 2019 with English translation (16 pages).

* cited by examiner

HIGH PRESSURE FUEL SUPPLY PUMP

TECHNICAL FIELD

The present invention relates to a high pressure fuel supply pump for pumping a fuel to a fuel injection valve of an internal combustion engine, and more particularly to a high pressure fuel pump including an electromagnetic suction valve for regulating the amount of fuel to be discharged.

BACKGROUND ART

For a direct injection type of an internal combustion engine of an automobile or the like where a fuel is directly injected to the inside of a combustion chamber, a high pressure fuel supply pump including an electromagnetic suction valve for highly pressurizing a fuel and discharging a desired fuel flow rate is widely used.

PTL 1 discloses a damper as a pressure pulsation reduction mechanism for reducing a low pressure pressure pulsation of a high pressure fuel supply pump, and a method of fixing the same. Pressure pulsation on a low pressure side occurs as a pressurizing member (plunger) is repeatedly reciprocatingly moved in a sliding manner in a cylinder.

CITATION LIST

Patent Literature

PTL 1: JP 3823060 B2

SUMMARY OF INVENTION

Technical Problem

However, the aforementioned conventional technique involves the problem described below. According to PTL 1, a low pressure pipe for connecting a vehicular fuel tank to an inlet (suction joint) of a high pressure fuel supply pump is constantly hydraulically connected to a low pressure passage that accommodates a pressure pulsation reduction mechanism. Thus, the pressure pulsation reduction mechanism cannot fully absorb the pressure pulsation in the low pressure passage, resulting in the problem that the pressure pulsation propagates into the low pressure pipe.

In addition, the low pressure pipe is often a combination of a metallic pipe portion and a rubber hose or plastic hose, resulting in the problem that the strength of the connection cannot withstand the pressure pulsation. Alternatively, there has been the problem that higher cost is needed to ensure the strength of the connection.

Furthermore, there has been the problem that the low pressure pipe is vibrated by the pressure pulsation and generates noise, resulting in a reduction in quietness of a vehicle.

It is an object of the present invention to obtain a high pressure fuel supply pump capable of reducing pressure pulsation that occurs in a low pressure pipe, to prevent damage to the low pressure pipe or reduce noise due to vibrations of the low pressure pipe.

Solution to Problem

From the above, the present invention provides a nigh pressure fuel supply pump of a type in which, from a fuel suction port connected to a low pressure pipe provided upstream of a fuel, a low pressure passage, an electromagnetic suction valve driven by an electromagnetic force, a pressurizing chamber in which the volume thereof is increased or reduced by a plunger that is reciprocatingly moved by being guided by a cylinder, and a discharge valve provided at an outlet of the pressurizing chamber are sequentially arranged, a fuel is sucked to the pressurizing chamber through the electromagnetic suction valve, the amount of a part of the fuel, which is sucked to the pressurizing chamber, to be returned to the low pressure passage side is adjusted so that the amount of the fuel to be discharged through the discharge valve is controlled, and the high pressure fuel supply pump includes a backflow suppression mechanism for suppressing backflow of fuel from the fuel from the fuel suction portion to the low pressure pipe side.

Advantageous Effects of Invention

According to the present invention configured in the aforementioned manner, the low pressure pipe may be a combination of a metallic pipe portion and a rubber hose or plastic hose such that the strength of the connection may be designed to sufficiently withstand the pressure pulsation. Alternatively, the cost for ensuring the strength of the connection can be reduced.

Furthermore, the low pressure pipe is vibrated by the pressure pulsation and generates noise, enabling maintenance of quietness of a vehicle.

DESCRIPTION OF EMBODIMENTS

Figure 1:
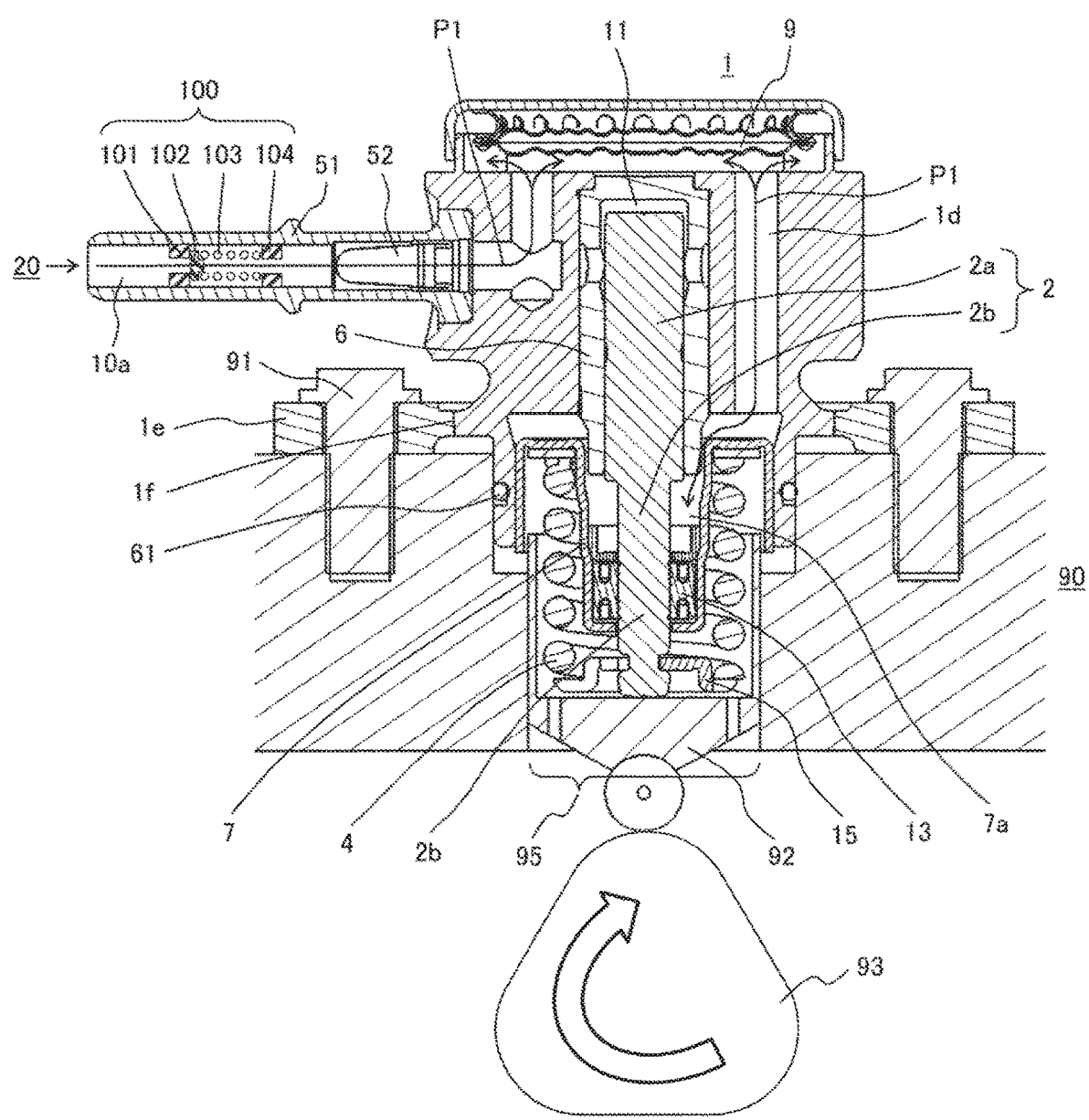
FIG. 1 is a view illustrating a longitudinal section including a pressure pulsation propagation prevention mechanism and a cylinder portion of a high pressure fuel supply pump of Example 1.

The present invention is described in detail below on the basis of examples illustrated in the drawings.

EXAMPLE 1

Figure 4:
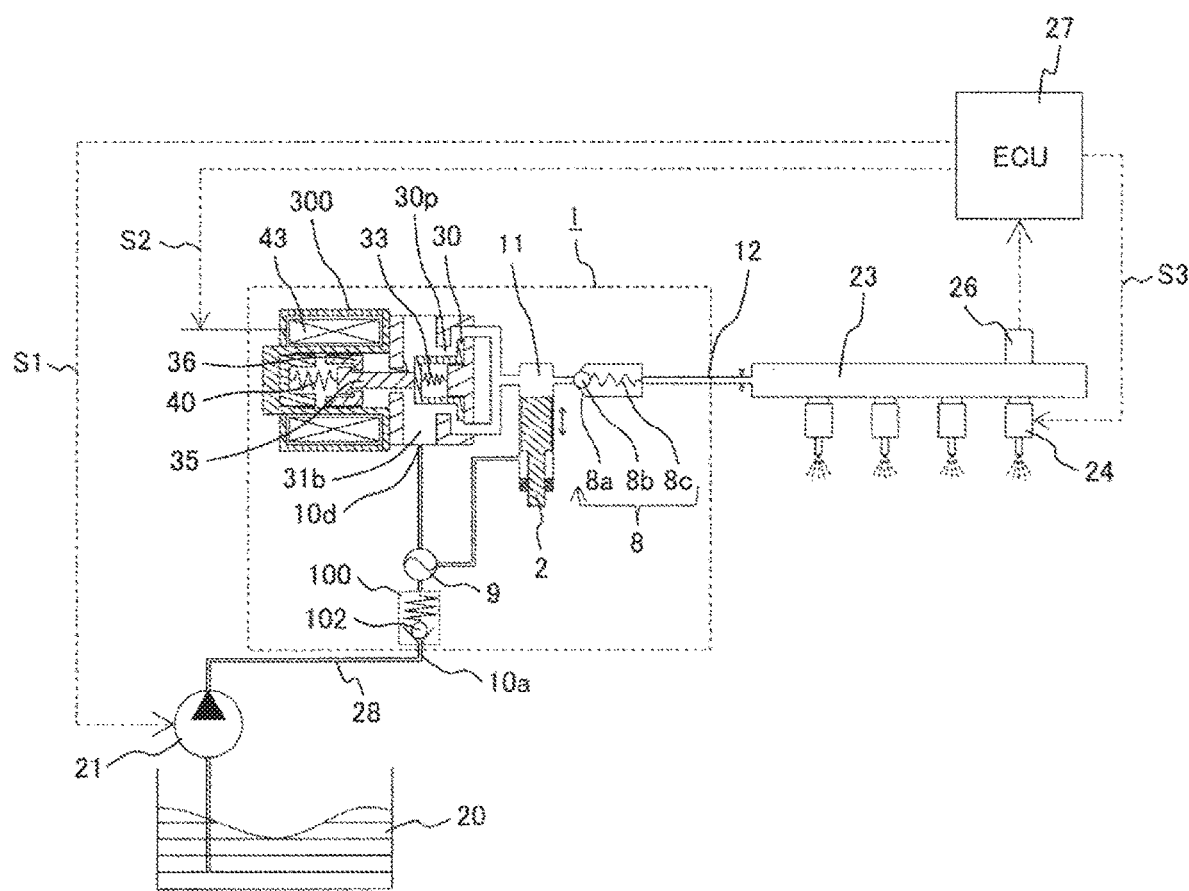
FIG. 4 is a diagram illustrating an example of an entire configuration of a general high pressure fuel supply pump system.

Before Example 1 is described, regarding an example of the entire configuration of a general high pressure fuel supply pump system, the configuration of the system, the functions and operation of portions are described in conjunction with FIG. 4. The examples below are all based on the configuration of FIG. 4, and configurations and functions of parts of the examples different from those of FIG. 4 will be apparent in the examples.

In the entire configuration of FIG. 4, a portion 1 enclosed by the dashed line indicates the main body of the high pressure fuel supply pump, indicating that, mechanisms and parts illustrated within the dashed line are integrally incorporated in the high pressure fuel supply pump main body 1.

The general configuration and function of the system, of FIG. 4 are as follows: A fuel in a fuel tank 20 is pumped up with a feed pump 21 and is supplied to the high pressure fuel supply pump 1, the highly pressurized fuel from the high, pressure fuel supply pump 1 is pumped to a common rail 23, and the fuel is injected to an engine, which is not illustrated, through injectors 24. The common rail 23 includes a pressure sensor 26. An engine control unit (hereinafter the ECU) 27 gives control signals S1, S2, S3 to the feed pump 21, an electromagnetic valve 43 in the high pressure fuel supply pump 1, and the injectors 24, respectively, on the basis of a signal from the pressure sensor 26, and controls them.

The configuration and function of the high pressure fuel supply pump 1 are described in detail below sequentially from a fuel intake side. First, the fuel in the fuel tank 20 is pumped up with the feed pump 21 on the basis of the signal S1 from the ECU 27, pressurized to an appropriate feed pressure, and delivered, to a low pressure fuel suction port 10a of the high pressure fuel supply pump via a suction pipe 28.

The fuel passing through the low pressure fuel suction port 10a reaches a suction port 31b of an electromagnetic suction valve 300, which constitutes a capacity variable mechanism, via a pressure pulsation reduction mechanism 9 and a suction passage 10d. The present invention is characterized by including a pressure pulsation propagation prevention mechanism 100 in the above route, and this portion will be described in detail separately.

The fuel flown into the suction port 31b of the electromagnetic suction valve 300 passes through a suction valve 30 and flows into a pressurizing chamber 11. The pressurizing chamber 11 is formed in a cylinder. Power for reciprocating movement is given to a plunger 2 by a cam mechanism 93 (described in FIGS. 1, 2, etc. and description will be given below) of an engine, and the volume and pressure in the pressurizing chamber 11 vary with the reciprocating movement of the plunger 2. Thus, by a downward stroke of the plunger 2, the volume in the pressurizing chamber 11 is increased (pressure reduction) and the fuel is sucked through the suction valve 30 portion, and by an upward stroke, the volume in the pressurizing chamber 11 is reduced (pressure increase) and the sucked fuel is pressurized. The pressurized fuel is pumped to the common rail 23 including the pressure sensor 26 via a discharge valve 8 and a fuel discharge port 12, and the fuel is injected to the engine by the injectors 24 on the basis of the signal S3 from the ECU 27.

The high pressure fuel supply pump discharges a fuel flow rate for a desired supply fuel according to the signal S2 sent from the ECU 27 to the electromagnetic suction valve 300.

The high pressure fuel supply pump system, illustrated in FIG. 4 is generally configured in the aforementioned manner. The symbols of parts which are not described with regard to FIG. 4 are properly described separately with reference to the drawings of other more detailed configurations.

Figure 2:
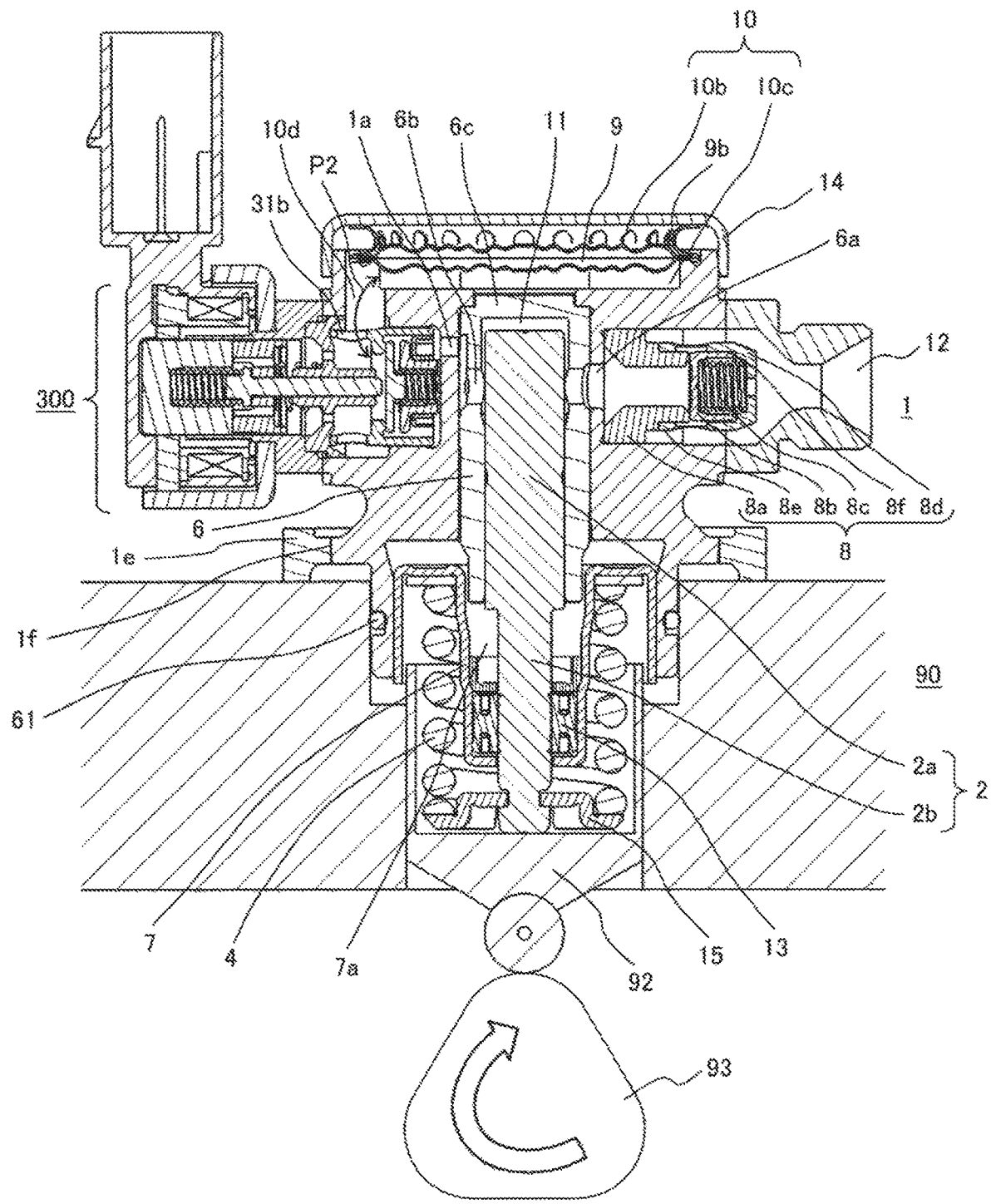
FIG. 2 is a view illustrating a longitudinal section including an electromagnetic suction valve and a discharge valve of the high pressure fuel supply pump of Example 1.
Figure 3:
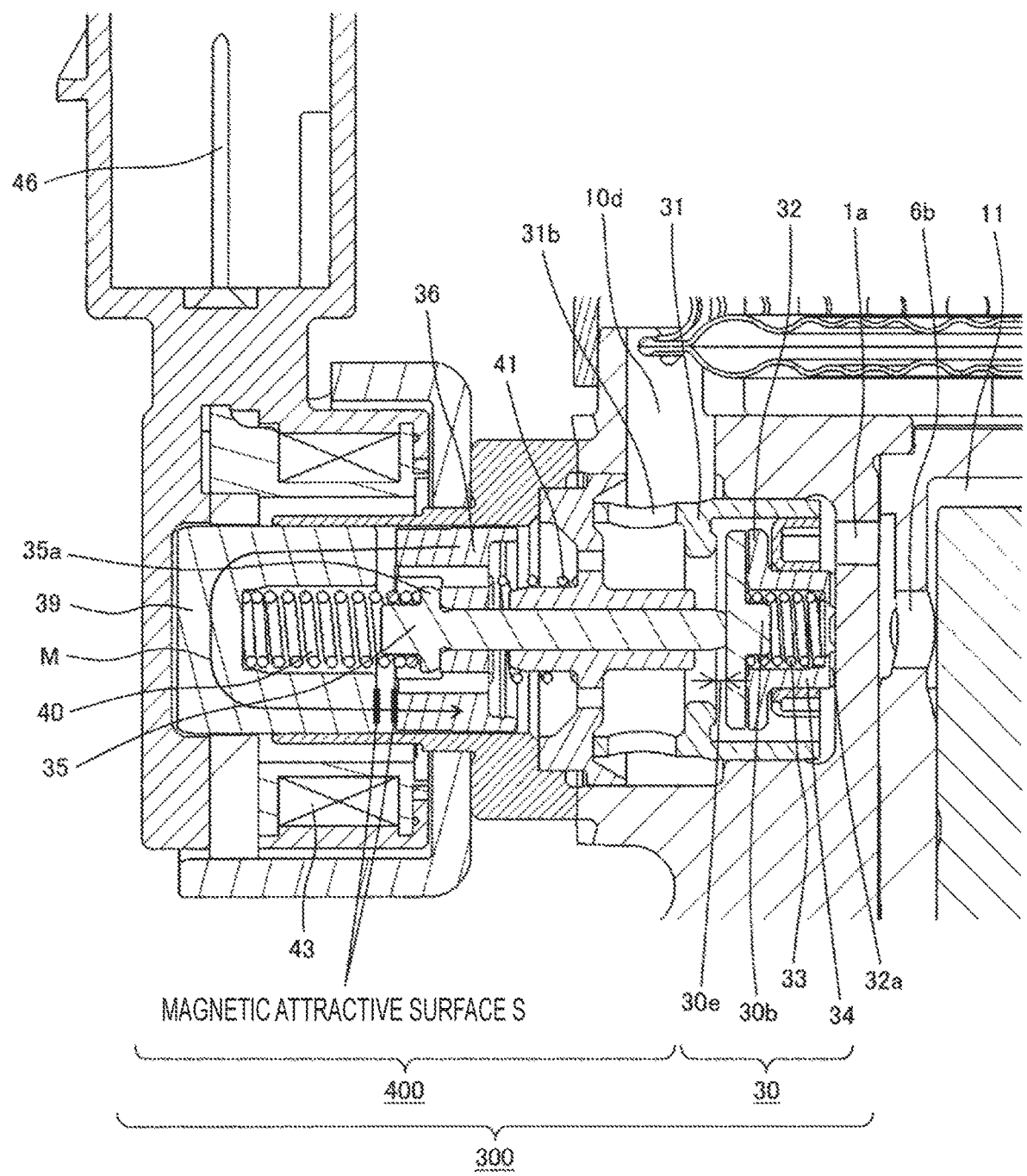
FIG. 3 is an enlarged view of the electromagnetic suction valve portion of FIG. 2, which is a view illustrating a valve opened state.

The detailed configuration and operation of the high pressure fuel supply pump are described in conjunction with FIGS. 1, 2 and 3. FIGS. 1, 2 and 3 are all views illustrating a longitudinal section of the high pressure fuel supply pump. FIG. 1 is a view of a longitudinal section including the pressure pulsation propagation prevention mechanism 100 and a cylinder portion of the high pressure fuel supply pump of Example 1, and FIG. 2 is a view of a longitudinal section including the electromagnetic suction valve 300 and the discharge valve 8 of the high pressure fuel supply pump of Example 1. FIG. 3 is an enlarged view of the electromagnetic suction valve 300 portion of FIG. 2.

In FIGS. 1 and 2, the main body 1 of the high pressure fuel supply pump is a structure disposed on a cylinder head 90 of the internal combustion engine. A hole 95 is formed through the cylinder head 90 into which a portion of a plunger lower portion 2b (pump attachment portion) of the high pressure fuel supply pump 1 is fitted. After the plunger lower portion 2b is fitted into the hole 95, the cylinder head 90 side and the high pressure fuel supply pump main body 1 side are fixed in the manner described below.

Generally, the high pressure fuel supply pump is closely attached to a plane surface of the cylinder head 90 of the internal combustion engine with a flange 1e provided on the pump main body 1 and is fixed with multiple bolts 91. The attachment flange 1e is joined to the pump main body 1 by welding across the entire circumference at a weld portion 1f and forms an annular fixed portion. In the present example, laser welding is used. An O-ring 61 is fitted onto the pump main body 1 to provide sealing between the cylinder head 90 and the pump main body 1, preventing leakage of engine oil to the outside.

A cylinder 6 is attached to the pump main body 1. The cylinder 6 guides the reciprocating movement of the plunger 2 and has an end portion which is formed in a bottomed cylindrical shape to form the pressurizing chamber 11 therein. Furthermore, the pressurizing chamber 11 includes an annular groove 6a on an outer circumference and multiple communication holes 6b through which the annular groove 6a is communicated with the pressurizing chamber 11 such that the pressurizing chamber 11 is communicated with the electromagnetic suction valve 300 (upper left side of FIG. 2) for fuel supply and with the discharge valve mechanism 8 (upper right side of FIG. 2) for fuel discharge from the pressurizing chamber 11 (upper middle of FIG. 2) to a discharge passage.

In addition, as illustrated in FIG. 2, the cylinder 6 at its outside diameter is fixed in a press-fit manner to the pump main body 1 to provide sealing with the cylindrical surface of the press-fit portion so as to prevent the pressurized fuel from being leaked from a gap between the cylinder 6 and the pump main body 1 to the low pressure side. In addition, the cylinder 6 includes a small diameter portion 6c at an outside diameter near the pressurizing chamber. When the fuel in the pressurizing chamber 11 is pressurized, a force is exerted to force the cylinder 6 toward a low pressure fuel chamber 10c side. However, as the pump main body 1 includes a small diameter portion 1a, the cylinder 6 is prevented from being removed toward the low pressure fuel chamber 10c side. As both surfaces are brought into contact in a plane in an axial direction, a double sealing function including the sealing of the contact cylindrical surface between the pump main body 1 and the cylinder 6 is provided, In FIGS. 1 and 2, a tappet 92 is provided on a lower end 2b of the plunger 2. The tappet 92 converts the rotary movement of a cam 93, which is attached to a cam shaft of the internal combustion engine, into an up-and-down movement and transmits it to the plunger 2. The plunger 2 is attached in a pressed manner to the tappet 92 by a spring 4 via a retainer 15. Thus, the plunger 2 can be reciprocatingly moved up and down by the rotary movement of the cam 93.

In addition, a plunger seal 13 held at a lower end portion of an inner circumference of a seal holder 7 is disposed in a state of slidably contacting with an outer circumference of the plunger 2 below the cylinder 6 in the drawing. When the plunger 2 is slid, the plunger seal 13 seals the fuel of an auxiliary chamber 7a and prevents inflow to the inside of the internal combustion engine. Simultaneously, the plunger seal 13 prevents a lubricant (including engine oil) for lubricating a sliding portion provided in the internal combustion engine from being flown into the inside of the pump main body 1.

In FIG. 1, which is a view of a longitudinal section including the pressure pulsation propagation prevention mechanism 100 and the cylinder portion of the high pressure fuel supply pump, a suction joint 51 is attached to the pump main body 1. The suction joint 51 is connected to the low pressure pipe that supplies the fuel from the fuel tank 20 of a vehicle, through which the fuel is supplied to the inside of the high pressure fuel supply pump. A suction filter 52 in the suction joint 51 serves to prevent foreign substances present between the fuel tank 20 and the low pressure fuel suction port 10a from being absorbed into the high pressure fuel supply pump by means of the flow of the fuel.

According to FIG. 1, the fuel passing through the low pressure fuel suction port 10a forms a flow channel P1 that reaches the pressure pulsation reduction mechanism 9 and reaches the auxiliary chamber 7a formed in the cylinder 6 via a low pressure fuel flow channel 1d. The flow channel P1 uses variations in pressure of the auxiliary chamber 7a in order to reduce the pressure pulsation of the fuel. The pressure pulsation reduction mechanism 9 reflects a pressure reduction state of the auxiliary chamber 7a when the pressurizing chamber 11 is in a pressurizing state as the plunger 2 is moved upward and, in contrast, reflects a pressurized state of the auxiliary chamber 7a when the pressurizing chamber 11 is in a pressure reduced state as the plunger 2 is moved downward, so that the pressure pulsation is reduced.

According to FIG. 2, which is a longitudinal section including the electromagnetic suction valve 300 and the discharge valve 8 of the high pressure fuel supply pump, the fuel passing through the low pressure fuel suction port 10a forms a flow channel P2 that reaches the pressure pulsation reduction mechanism 9 and reaches the suction port 31b of the electromagnetic suction valve 300 via the low pressure fuel flow channel 10d. Furthermore, the fuel reaches the discharge valve mechanism 8 from the flow channel P2 via the electromagnetic suction valve 300 and the pressurizing chamber 11.

The main body 1 of the high pressure fuel supply pump is formed with such configurations and functions. Among these, first, the discharge valve mechanism 8, which is a main function, is described. In FIG. 2, the discharge valve mechanism 8 is provided at an outlet of the pressurizing chamber 11. The discharge valve mechanism 8 includes a discharge valve seat 8a, a discharge valve 8b that is brought to be in and out of contact with the discharge valve seat 8a, a discharge valve spring 8c for biasing the discharge valve 8b against the discharge valve seat 8a, and a discharge valve holder 8d for accommodating the discharge valve 8b and the discharge valve seat 8a. The discharge valve seat 8a and the discharge valve holder 8d are joined by welding at a contact portion 8e and form the monolithic discharge valve mechanism 8. The interior of the discharge valve holder 8d includes a stepped portion 8f that forms a stopper for restricting the stroke of the discharge valve 8b.

The discharge valve mechanism 8 with the aforementioned manner operates in the manner described below when combined with the pressurizing chamber 11 provided upstream in the fuel flow channel. First, in a state where there is no fuel pressure difference between the pressurizing chamber 11 and the fuel discharge port 12, the discharge valve 8b is in a valve closed state by being attached in a pressed manner to the discharge valve seat 8a by the biasing force of the discharge valve spring 8c.

Only when the fuel pressure of the pressurizing chamber 11 becomes greater than the fuel pressure of the fuel discharge port 12, the discharge valve 8b is opened against the discharge valve spring 8c, and the fuel in the pressurizing chamber 11 is discharged at high pressure to the common rail 23 via the fuel discharge port 12.

The discharge valve 8b, when opened, contacts with the discharge valve stopper 8f, and the stroke is restricted. Accordingly, the stroke of the discharge valve 8b is properly determined by the discharge valve stopper 8d. Thus, the stroke is prevented from being excessively large, so that the fuel discharged at high pressure to the fuel discharge port 12 does not flow back into the pressurizing chamber 11 due to delay of closure of the discharge valve 8b, enabling suppression of a reduction in efficiency of the high pressure fuel supply pump.

In addition, when the discharge valve 8b repeats the valve opening and valve closing movement, the discharge valve 8b is guided by an inner circumferential surface of the discharge valve holder 8d so that the discharge valve 8b is moved in the stroke direction only. With the above configuration, the discharge valve mechanism 8 serves as a check valve for restricting the circulation direction of the fuel.

A configuration and a function of the electromagnetic suction valve 300, which is a main function of the high pressure fuel supply pump, are described in conjunction with FIG. 3. The electromagnetic suction valve 300 includes the suction valve 30 and an electromagnetic valve 400. Among these, the electromagnetic valve 400 includes an electromagnetic coil 43, a rod 35, and a rod biasing spring 40 as main parts.

With this configuration, when the electromagnetic coil 43 is in a non-excited state, the electromagnetic valve 400 lies in a position illustrated in FIG. 3. In contrast, when a control signal S1 from the ECU 27 is given, the electromagnetic coil 43 is biased and a magnetic circuit M is formed by a loosely fit member 36, a member 39 and magnetic attractive surfaces S, so that the loosely fit member 36 is attracted to the member 39 side against the spring force of the rod biasing spring 40. In addition, as the loosely fit member 36 is attracted, the rod 35 is also moved toward the member 39 side by an engagement portion 35a.

Regarding the suction valve 30, a valve element 30b is pressed by a suction valve biasing spring 33 leftward in the drawing and, on the other hand, is pressed by the rod 35 to the right side in the drawing. With this configuration, the electromagnetic coil 43 in a non-excited state lies in a position illustrated in FIG. 3 and the valve element 30b of the suction valve 30 is in a valve opened state such that an opening 30e is ensured with respect to a suction valve valve seat 31. When the electromagnetic coil 43 is excited, the valve element 30b of the suction valve 30 is moved leftward by the suction valve biasing spring 33 following the leftward movement of the rod 35. As a result, the opening 30e with respect to the valve seat 31 of the suction valve is eliminated, and the suction valve 30 is brought into a closed state.

As described above, the high pressure fuel supply pump 5 includes the pressurizing chamber 11, the pump main body 1, the electromagnetic suction valve 300, the plunger 2, the cylinder 6, and the discharge valve mechanism 8.

The pressure in the pressurizing chamber 11 in the above description depends on the motion of the cam 93 of the internal combustion engine side. Therefore, next, the relationship with the cam 93 of the internal combustion engine side that determines the pressure in the pressurizing chamber 11 is described. In FIG. 2, in a suction stroke state where the plunger 2 is moved in a direction toward the cam 93 by the rotation of the cam 93, the volume of the pressurizing chamber 11 is increased and the fuel pressure in the pressurizing chamber 11 is reduced. When the fuel pressure in the pressurizing chamber 11 becomes smaller than the pressure of the suction passage 10d in the stroke, because the suction valve 30 is in a opened state, the fuel passes the opening 30e and passes through a communication hole 1a formed through the pump main body 1 and a cylinder outer circumference passage 6d so as to flow into the pressurizing chamber 11.

After the plunger 2 completes the suction stroke, the plunger 2 turns to upward movement to shift to a compression stroke. The electromagnetic coil 43 remains in a non-energized state and does not apply a magnetic biasing force. The rod biasing spring 40 is set to have a biasing force sufficient enough to keep the suction valve 30 opened in a non-energized state. The volume of the pressurizing chamber 11 is reduced by the compression movement of the plunger 2. However, in this state, the fuel once sucked to the pressurizing chamber 11 is returned to the suction passage 10d through the opening 30e of the suction valve 30 in a valve opened state. Therefore, the pressure of the pressurizing chamber does not increase. This stroke is called a return stroke.

In this state, when a control signal from the engine control unit 27 (hereinafter the ECU) is applied to the electromagnetic suction valve 300, a current flows through the electromagnetic coil 43 via a terminal 46, and the magnetic biasing force overcomes the biasing force of the rod biasing spring 40 so that the rod 35 moves in a direction away from the suction valve 30. Thus, the suction valve 30 is opened by the biasing force of the suction valve biasing spring 33 and the fluid force obtained as the fuel flows into the suction passage 10d. After the valve is closed, the fuel pressure of the pressurizing chamber 11 is increased along with the upward movement of the plunger 2. When the fuel pressure becomes equal to or above the pressure of the fuel discharge port 12, the fuel is discharged at high pressure through the discharge valve mechanism 8 and is supplied to the common rail 23. This stroke is called a discharge stroke.

In other words, the compression stroke (upward stroke between a bottom starting point and a top starting point) of the plunger 2 consists of the return stroke and the discharge stroke. Furthermore, controlling the timing of energization of the coil 43 of the electromagnetic suction valve 300 enables control of the amount of high pressure fuel to be discharged. When the electromagnetic coil 43 is energized at an early timing, the proportion of the return stroke is small and the proportion of the discharge stroke is large in the compression stroke. In other words, less fuel is returned to the suction passage 10d and more fuel is discharged at high pressure.

When the timing of energization is late, the proportion of the return stroke is large and the proportion of the discharge stroke is small in the compression stroke. In other words, more fuel is returned to the suction passage 10d and less fuel is discharged at high pressure. The timing of energization of the electromagnetic coil 43 is controlled by a command from the ECU 27.

With the aforementioned configuration, when the timing of energization of the electromagnetic coil 43 is controlled, the amount of fuel to be discharged at high pressure can be controlled to an amount required by the internal combustion engine.

In the high pressure fuel supply pump system generally configured in the aforementioned manner, the pressure pulsation reduction mechanism 9 for reducing spread of the pressure pulsation, which is generated in the high pressure fuel supply pump, to the fuel pipe 28 (FIG. 4) is disposed in the low pressure fuel chamber 10.

When the fuel, which has once flown into the pressurizing chamber 11, is returned to the suction passage 10d (suction port 31b) through the suction valve body 30 in a valve opened state for the purpose of capacity controlling, pressure pulsation occurs in the low pressure fuel chamber 10 because of the fuel returned to the suction passage 10d. The pressure pulsation reduction mechanism 9 provided in the low pressure fuel chamber 10 is formed of a metal diaphragm damper. The metal diaphragm damper is formed as two corrugated disk-shaped metal plates are affixed together at their outer circumferences and an inert gas, e.g., argon, is injected into the inside thereof. The pressure pulsation is absorbed and reduced as the metal damper is expanded and contracted. In FIG. 2, reference numeral 9b denotes an attachment metal fitting for fixing the metal damper to an inner circumferential portion of the pump main body 1. Because the attachment metal fitting 9b is disposed on the fuel passage, multiple holes are formed so that the fluid can freely travel over the front and back of the attachment metal fitting 9b.

Meanwhile, in FIG. 2, the plunger 2 includes a large diameter portion 2a and a small diameter portion 2b. The reciprocating movement of the plunger increases or reduces the volume of the auxiliary chamber 7a. The auxiliary chamber 7a is communicated with the low pressure fuel chamber 10 by the fuel passage 1d. When the plunger 2 moves downward, the flow of fuel is generated from the auxiliary chamber 7a to the low pressure fuel chamber 10, and when the plunger 2 moves upward, the flow of fuel is generated from low pressure fuel chamber 10 to the auxiliary chamber 7a.

Thus, a function whereby a fuel flow rate to the inside or outside of the pump in the suction stroke or return stroke of the pump can be reduced so as to reduce the pressure pulsation that occurs in the high pressure fuel supply pump is provided.

The mechanism of generation of low pressure side (low pressure side, upstream of the pressurizing chamber 11) pulsation (hereinafter the low pressure pressure pulsation) generated by the reciprocating movement of the plunger 2 and a mechanism for reducing it are described in detail below.

In the suction stroke, the volume of the pressurizing chamber 11 is increased and the volume of the auxiliary chamber 7a is reduced by the downward movement of the plunger 2. Thus, the fuel flows into the pressurizing chamber 11 and flows out of the auxiliary chamber 7a. The high pressure fuel supply pump for both of them must suck a fuel for such difference.

In the return stroke and pressurizing stroke, the volume of the pressurizing chamber 11 is reduced and the volume of the auxiliary chamber 7a is increased by the upward movement of the plunger 2.

In the return stroke, part of the fuel flowing out of the pressurizing chamber 11 flows into the auxiliary chamber 7a, and the high pressure fuel supply pump must return the rest.

In the pressurizing stroke, the fuel of the pressurizing chamber 11 is discharged at high pressure. Because the fuel flows into the auxiliary chamber 7a, the high pressure fuel supply pump must suck a fuel for such inflow.

The pressure pulsation reduction mechanism 9 has a function of reducing the low pressure pressure pulsation that is generated by the aforementioned three strokes. However, the pressure pulsation reduction mechanism 9 and the low pressure fuel suction port 10a are fully hydraulically connected, and a part or a large part of the low pressure pressure pulsation propagates to the vehicle side via the low pressure fuel suction port 10a.

The aforementioned three processes are separately generated by the introduction of the electromagnetic suction valve 300. Originally, there are only two processes: the suction stroke and the pressurizing stroke without adoption of the electromagnetic suction valve 300. The present invention prevents the propagation of pressure pulsation in all the three processes generated by the introduction of the electromagnetic suction valve 300.

According to the present invention, as illustrated in FIG. 1, the pressure pulsation propagation prevention mechanism 100 is provided upstream of the suction joint 51. The pressure pulsation propagation prevention mechanism 100 includes a valve seat 101, a valve 102, a spring 103, and a spring stopper 104. The valve 101 is pressed against the valve seat by the spring 103. The other end of the spring 103 is restricted by the spring stopper 104. The outside diameters of the seat 101 and the spring stopper 104 are fixed in a press-fit manner to the inside diameter of the suction joint 51. The valve seat 101 and the spring stopper 104 include holes that serve as a fuel passage.

With the aforementioned configuration, when the fuel flows in a direction from the low pressure fuel suction port 10a to the pressure pulsation reduction mechanism 9, the suction valve 102 is opened against the biasing force of the spring 103, and the fuel passes through the fuel passage hole in the valve seat 101 so that the flow flows to the inside of the high pressure fuel supply pump. In this case, there is a problem that, when the biasing force of the spring 103 is excessively large, the valve 102 is not opened or, even when opened, a pressure loss is large. The valve opening pressure of the valve 102 is determined by the biasing force of the spring 103. The valve opening pressure is preferably smaller. Therefore, the biasing force of the spring 103 is required to be set to a corresponding value.

When the fuel flows in a direction from the pressure pulsation reduction mechanism 9 to the low pressure fuel suction port 10a, the valve 102 contacts with the valve seat 101 and blocks the hole which serves as a fuel passage formed through the valve seat 101.

With such a structure, the pressure pulsation propagation prevention mechanism 100 functions as a check valve that allows the fuel to flow only in a direction from the low pressure fuel suction port 10a to the pressure pulsation reduction mechanism 9.

In the present example, the fuel is required to be sucked through the low pressure fuel suction port 10a in the suction stroke and the discharge stroke. Therefore, the pressure pulsation propagation prevention mechanism 100 is opened. In the return stroke, the fuel flows from the low pressure fuel suction port 10a to the low pressure pipe (outside of the high pressure fuel supply pump). However, the pressure pulsation propagation prevention mechanism 100 is closed by the biasing force of the spring 103 to prevent outflow of the fuel. The fuel, which could not outflow, is absorbed by the pressure pulsation reduction mechanism 9.

With the aforementioned configuration, a part or a large part of the low pressure pressure pulsation is prevented from propagating to the vehicle side via the low pressure fuel suction port 10a.

In addition, in the moment of transition from the suction stroke to the return stroke (in the moment of transition of the plunger 2 from the downward movement to the upward movement), the fuel in the low pressure fuel suction port 10a and the low pressure pipe has a momentum in a direction in which the fuel flows into the high pressure fuel supply pump. Thus, immediately after the starting of the return stroke (immediately after the starting of the upward movement of the plunger 2), the fuel still flows in a direction from the low pressure fuel suction port 10a to the pressure pulsation reduction mechanism 9. In the pressure pulsation propagation prevention mechanism 100, temporal delay occurs during transition from the valve opened state to the valve closed state due to the mass of the valve 102.

Thus, immediately after the starting of the return stroke, the fuel flows from the low pressure fuel suction port 10a to the inside of the high pressure fuel supply pump. There has been a problem that, when the fuel flows at such an unintended timing, the low pressure pressure pulsation is increased. This tendency is significant particularly during high-speed operation of the internal combustion engine, i.e., when the velocity of the reciprocating movement of the plunger 2 of the high pressure fuel supply pump is large. This is because, when the velocity of the reciprocating movement of the plunger 2 is large, the momentum of the fuel immediately after the starting of the return stroke is large.

Thus, it is structured such that, even when the valve 102 is closed and contacts with the valve seat 101, the low pressure fuel suction port 10a is not fully hydraulically disconnected to the pressure pulsation reduction mechanism 9 to allow a very small amount of fuel to be leaked in a direction from the pressure pulsation reduction mechanism 9 to the low pressure fuel suction port 10a. Thus, the fuel flown by the momentum of the fuel in an early stage of the return stroke flows out of the high pressure fuel supply pump during the rest of the return stroke, and the present problem is solved.

Specifically, there is a method of enabling leakage by setting a large surface roughness of the contact surface between the valve 102 and the valve seat 101.

An alternative is a method of opening a very small hole at a central part of the valve. A further alternative is a method of providing a micro gap between the suction joint 51 and the valve seat 102 such that the press-fit portion between the suction joint 51 and the valve seat 102 is not press-fitting across the entire circumferential surface.

The low pressure pipe is often a combination of a metallic pipe portion and a rubber hose or plastic hose, and there has been a problem that the strength of the connection cannot withstand the pressure pulsation or higher cost is needed to ensure the strength of the connection. However, the problem can be solved by the aforementioned configuration.

EXAMPLE 2

Figure 5A:
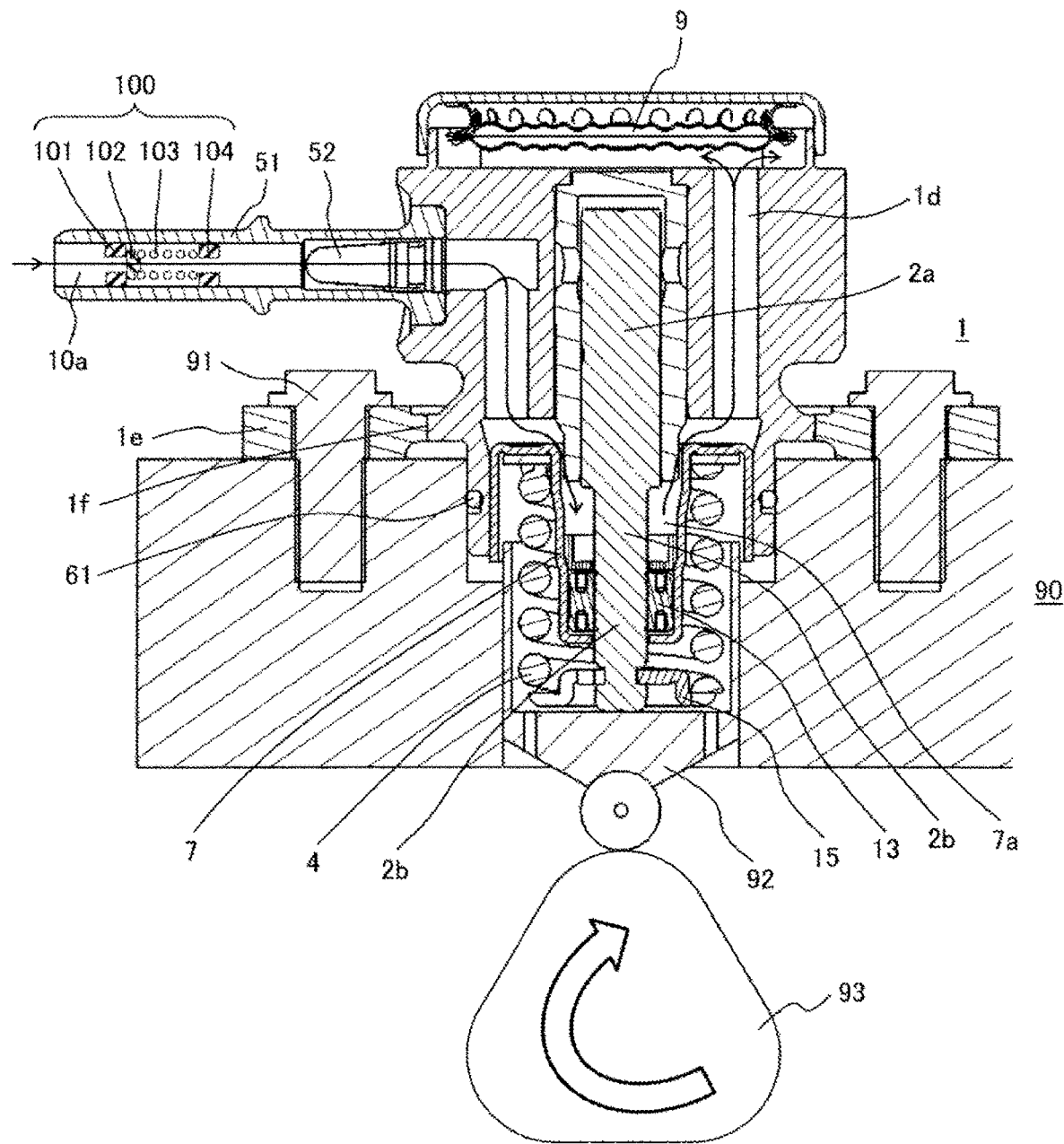
FIG. 5A is a view illustrating a longitudinal section of a main body structure of a high pressure fuel supply pump of Example 2.
Figure 5B:
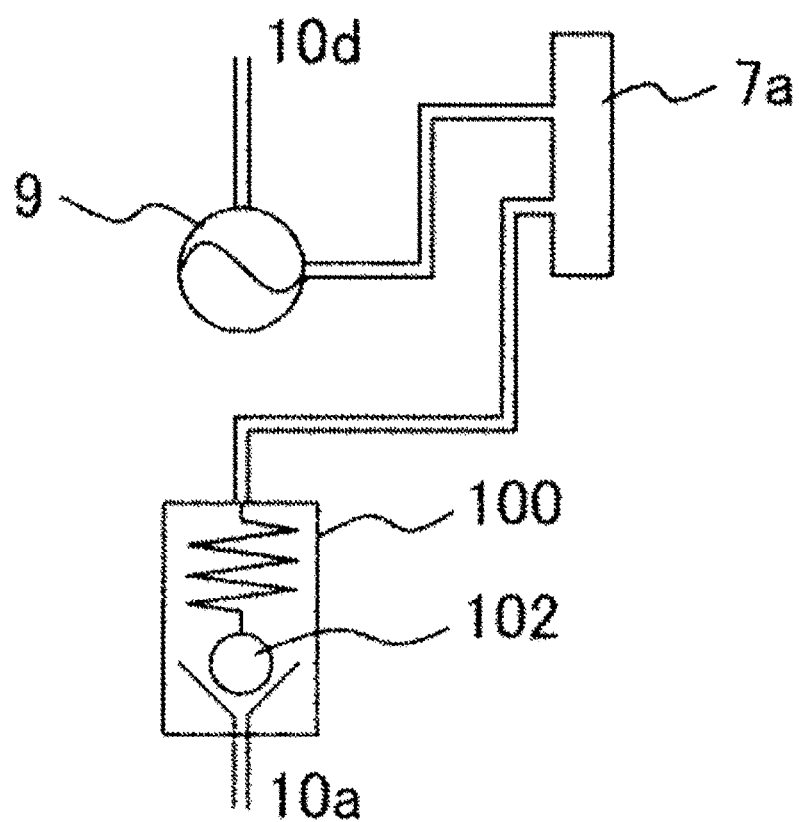
FIG. 5B is a diagram illustrating a low pressure passage system in the case of the main body structure of the high pressure fuel supply pump of Example 2.

Example 2 is described in conjunction with FIGS. 5a and 5b. FIG. 5a is a main body structure of a high pressure fuel supply pump according to Example 2, and FIG. 5b illustrates a low pressure passage system in the case of the main body structure.

A difference from Example 1 is as follows: the fuel flown into the high pressure fuel supply pump from the low pressure fuel suction port 10a is first sucked to the auxiliary chamber 7a from the pressure pulsation propagation prevention mechanism 100, then passes through the fuel passage 1d, and reaches the low pressure pulsation reduction mechanism 9. Other than the points above, Example 2 is the same as Example 1.

With such a configuration, the effect of suppressing the propagation of the pressure pulsation that cannot be absorbed by the low pressure pulsation reduction mechanism 9 to the low pressure pipe can be obtained as in Example 1.

In addition, the problem that in the moment of transition from the suction stroke to the return stroke, the fuel is excessively sucked to the inside of the high pressure fuel supply pump because of the momentum of the fuel and the result is an increased low pressure pressure pulsation can also be solved by the same method as Example 1.

EXAMPLE 3

Figure 6A:
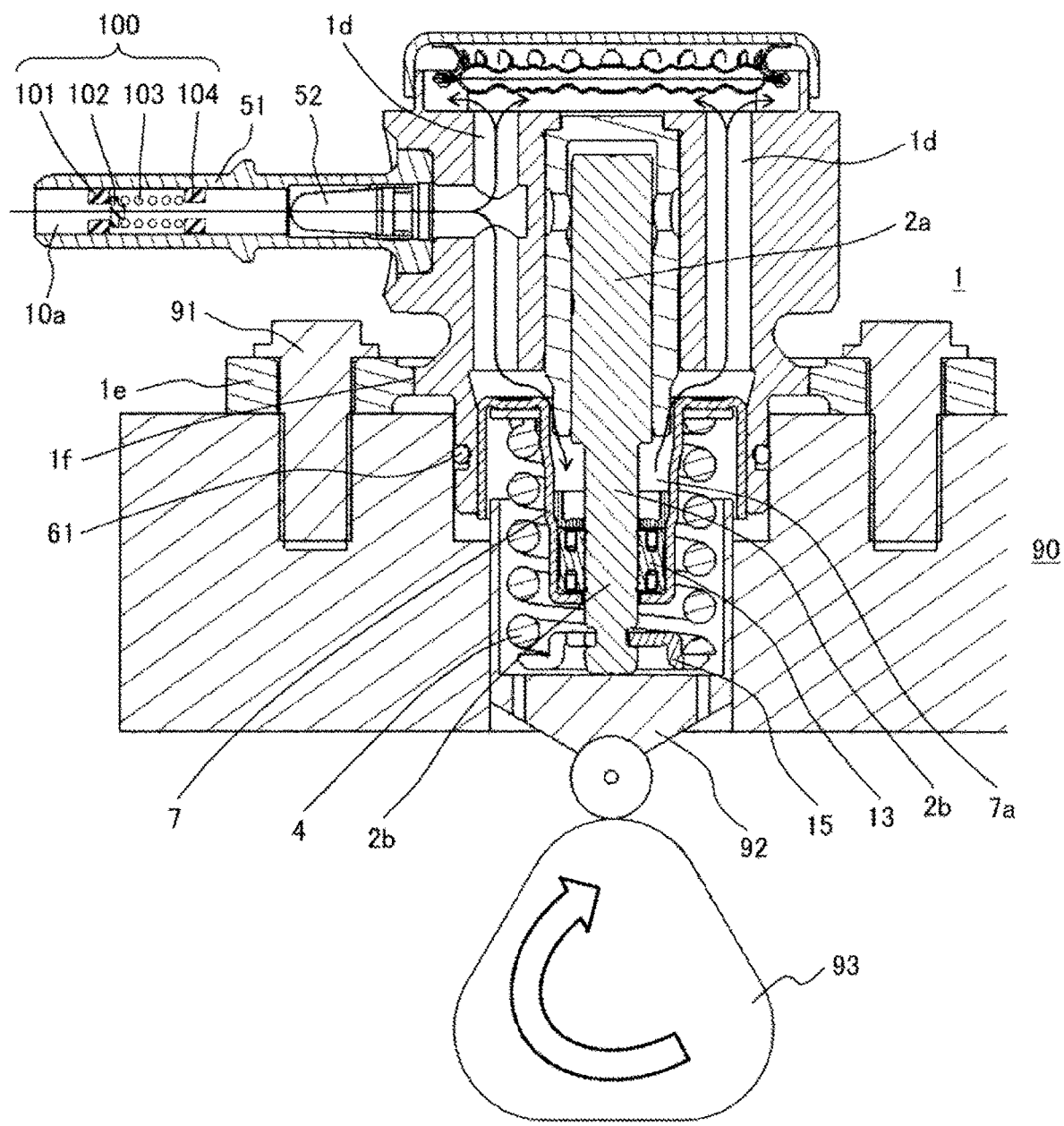
FIG. 6A is a view illustrating a longitudinal section of a main body structure of a high pressure fuel supply pump of Example 3.
Figure 6B:
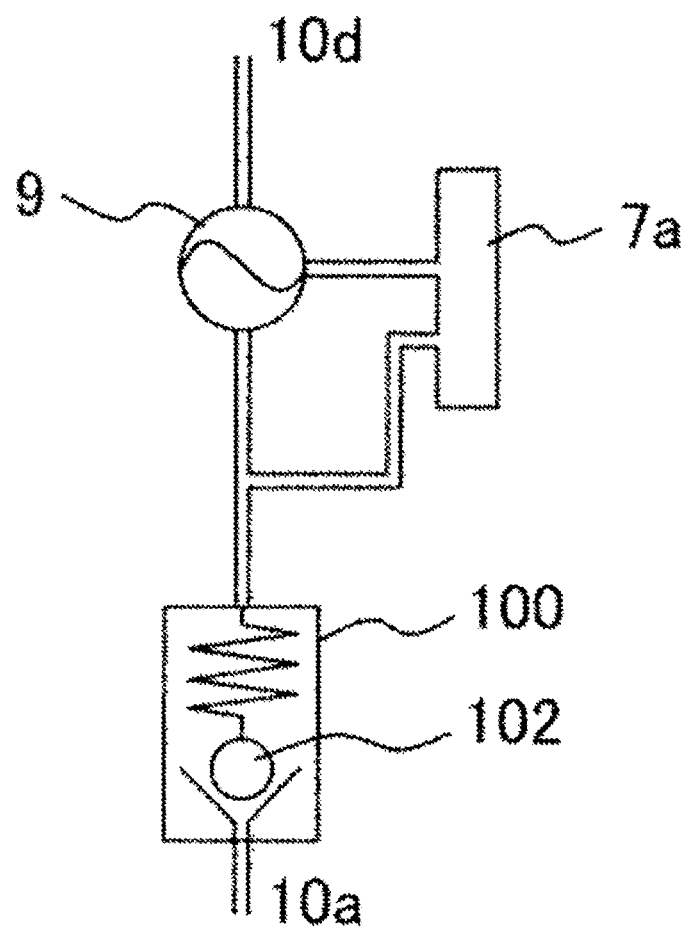
FIG. 6B is a diagram illustrating a low pressure passage system in the case of the main body structure of the high pressure fuel supply pump of Example 3.

Example 3 is described in conjunction with FIGS. 6a and 6b. FIG. 6a is a main body structure of a high pressure fuel supply pump according to Example 3, and FIG. 6b illustrates a low pressure passage system in the case of the main body structure.

A difference from Example 1 is as follows: the fuel flown into the high pressure fuel supply pump from the low pressure fuel suction port 10a is split and reaches the auxiliary chamber 7a and the low pressure pulsation reduction mechanism 9 from the pressure pulsation propagation prevention mechanism 100. Other than the points above, Example 3 is the same as Example 1.

With such a configuration, the effect of suppressing the propagation of the pressure pulsation that cannot be absorbed by the low pressure pulsation reduction mechanism 9 to the low pressure pipe can be obtained as in Example 1. In addition, the problem that in the moment of transition from the suction stroke to the return stroke, the fuel is excessively sucked to the inside of the high pressure fuel supply pump because of the momentum, of the fuel and. low pressure pressure pulsation, is increased, can also be solved by the same method as Example 1.

EXAMPLE 4

Figure 7:
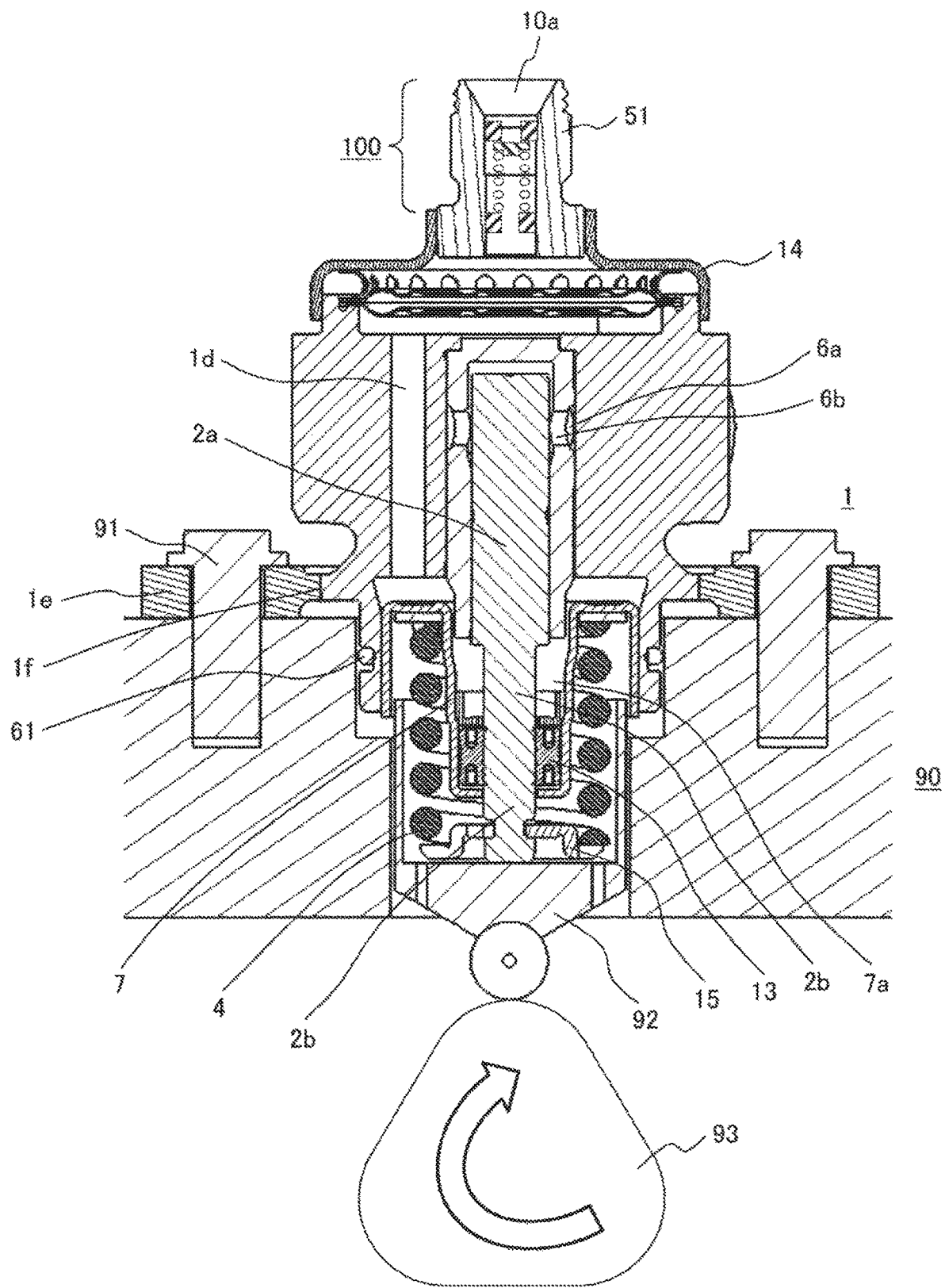
FIG. 7 is a view illustrating a longitudinal section of a main body structure of a high pressure fuel supply pump of Example 4.
Figure 8:
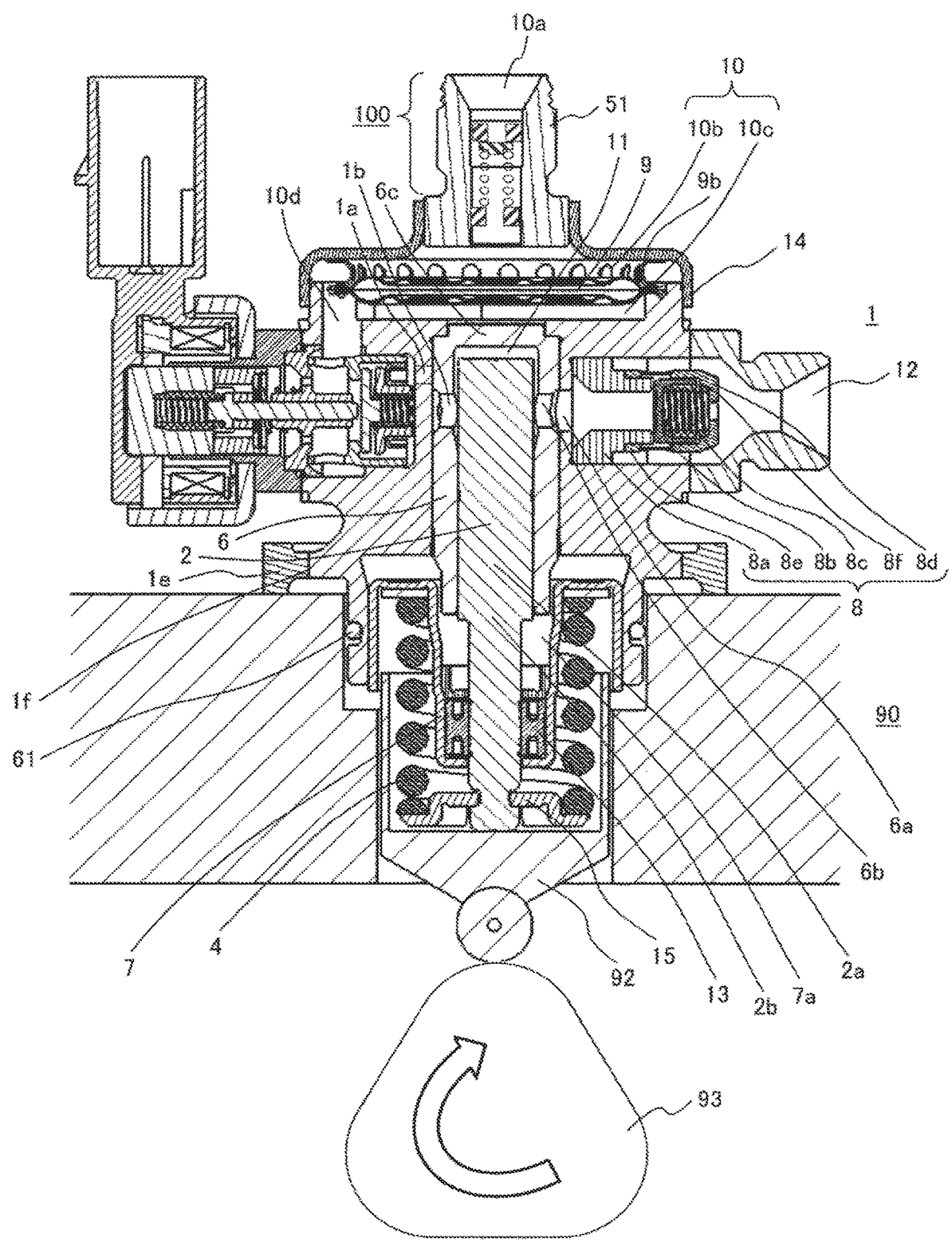
FIG. 8 is a view illustrating a longitudinal section of the main body structure of the high pressure fuel supply pump of Example 4.

Example 4 is described in conjunction with FIGS. 7 and 8. FIGS. 7 and 8 are both views illustrating different, longitudinal sections of a high pressure fuel supply pump.

A difference between FIGS. 7 and 8 and Example 1 is as follows: the pressure pulsation propagation prevention mechanism 100 is disposed not on a side portion, but on a head portion in an erected manner and the suction joint 51 is fixed to a cover 14. Other than the points above, Example 4 is exactly the same as Example 1. In this case, the same effect as that of Example 1 can be obtained.

In addition, the problem that in the moment of transition from the suction stroke to the return stroke, the fuel is excessively sucked to the inside of the high pressure fuel supply pump because of the momentum of the fuel and low pressure pressure pulsation is increased can also be solved by the same method as Example 1.

Heretofore, the examples of the present invention have been described. The present invention includes the backflow suppression mechanism, that suppresses the backflow of fuel from the suction joint to the low pressure pipe at least in the stroke of returning the fuel sucked to the pressurizing chamber back to the low pressure passage. Thus, at least in the return stroke of returning the fuel sucked to the pressurizing chamber back to the low pressure passage, the low pressure pipe connecting the vehicular fuel tank to the inlet (suction joint) of the high pressure fuel supply pump is hydraulically disconnected from the low pressure passage. Alternatively, it is structured, such that they are hardly hydraulically communicated. Thus, the backflow of fuel from the nigh pressure fuel supply pump to the vehicular low pressure pipe can be suppressed, enabling a reduction in pressure pulsation that occurs in the low pressure pipe.

Furthermore, it is configured to include the pressure pulsation reduction mechanism for reducing the pressure pulsation in the low pressure passage. Thus, the backflow of fuel from the high pressure fuel supply pump to the vehicular low pressure pipe can be suppressed more effectively, enabling a reduction in pressure pulsation that occurs in the low pressure pipe.

In addition, as the backflow suppression mechanism for suppressing the backflow of fuel from the suction joint to the low pressure pipe, it is configured to include a check valve in the suction joint or between the suction joint and the pressure pulsation reduction mechanism, so that the backflow of fuel from the high pressure fuel supply pump to the vehicular low pressure pipe can be suppressed more effectively, enabling a reduction in pressure pulsation that occurs in the low pressure pipe.

In addition, as the backflow suppression mechanism for suppressing the backflow of fuel from the suction joint to the low pressure pipe, it is configured to include a reed valve in the suction joint or between the suction joint and the pressure pulsation reduction mechanism, so that the backflow of fuel from the high pressure fuel supply pump to the vehicular low pressure pipe can be suppressed more effectively, enabling a reduction in pressure pulsation that occurs in the low pressure pipe.

Furthermore, it is configured such that the plunger includes, on a side opposite from the pressurizing chamber, a small diameter portion having a diameter smaller than that of a large diameter portion, which is guided by a cylinder, a fuel auxiliary chamber that presents a volume change that is contrary to a volume change of the pressurizing chamber through the reciprocating movement of the plunger is formed around the small diameter portion of the plunger, and the auxiliary chamber is connected to the low pressure passage. Thus, the pressure pulsation that occurs inside the high pressure fuel supply pump can be reduced and the backflow of fuel from the high pressure fuel supply pump to the vehicular low pressure pipe can be suppressed more effectively, enabling a reduction in pressure pulsation that occurs in the low pressure pipe.

Furthermore, it is configured such that the fuel sucked to the high pressure fuel supply pump from the suction joint through the backflow suppression mechanism flows into the low pressure passage accommodating the pressure pulsation reduction mechanism before flowing into the auxiliary chamber. Thus, the pressure pulsation can be absorbed by the pressure pulsation reduction mechanism more effectively and the backflow of fuel from the high pressure fuel supply pump to the vehicular low pressure pipe can be suppressed, enabling a reduction in pressure pulsation that occurs in the low pressure pipe.

Furthermore, it is configured such that the fuel sucked to the high pressure fuel supply pump from the suction joint through the backflow suppression mechanism flows into the auxiliary chamber before flowing into the low pressure passage accommodating the pressure pulsation reduction mechanism. Thus, the auxiliary chamber and the low pressure pipe are not or hardly hydraulically connected, enabling a reduction in pressure pulsation that occurs in the low pressure pipe.

Furthermore, it is configured such that the suction valve includes a very small hole through which a very small amount of fuel can flow back from the suction port to the low pressure pipe. Thus, the fuel sucked to the high pressure fuel supply pump at an unintended timing because of the momentum of the fuel can be discharged, enabling a reduction in pressure pulsation.

REFERENCE SIGNS LIST 1 high pressure fuel supply pump
1e flange
1d low pressure fuel flow channel
1f weld portion
2 plunger
2a large diameter portion
2b small diameter portion (plunger lower portion)
4 spring
6 cylinder
6a annular groove
6b communication hole
6c small diameter portion
6d cylinder outer circumference passage
7 seal holder
7a auxiliary chamber
8 discharge valve mechanism
8a discharge valve seat
8b discharge valve
8C discharge valve spring
8d discharge valve holder
8e contact portion
8f stepped portion
9 pressure pulsation reduction mechanism
10 low pressure fuel chamber
10d suction passage
11 pressurizing chamber
12 fuel discharge port
13 plunger seal
14 cover
15 retainer
20 fuel tank
21 feed pump
23 common rail
24 injector
26 pressure sensor
27 engine control unit ECU
28 suction pipe
30b valve element
30e opening
31 suction valve valve seat
31b suction port
33 suction valve biasing spring
35 rod
35a engagement portion
36 loosely fit member
39 member
40 rod biasing spring
43 electromagnetic coil
46 terminal
51 suction joint
52 suction filter
61 O-ring
90 cylinder head of internal combustion engine
91 bolt
93 cam mechanism of engine
95 hole
100 pressure pulsation propagation prevention mechanism
101 valve seat
102 valve
103 spring
104 spring stopper
S1, S2, S3 control signal
300 electromagnetic suction valve
92 tappet
P1, P2 flow channel
S magnetic attractive surface
M magnetic circuit

The invention claimed is:

1. A high pressure fuel supply pump comprising:
a fuel suction port connected to an upstream low pressure pipe;
a low pressure passage;
an electromagnetic suction valve driven by an electromagnetic force;
a pressurizing chamber in which the volume thereof is increased or reduced by a plunger that is reciprocatingly moved by being guided by a cylinder;
a discharge valve provided at an outlet of the pressurizing chamber are sequentially arranged, wherein
a fuel is sucked to the pressurizing chamber through the electromagnetic suction valve, and
the amount of a part of the fuel, which is sucked to the pressurizing chamber, to be returned to the low pressure passage side is adjusted so that the amount of the fuel to be discharged through the discharge valve is controlled;
a suction joint attached to a pump main body, wherein the suction joint is provided outside a cover and the pump main body;
a backflow suppression mechanism for suppressing backflow of fuel from fuel suction portion to the low pressure pipe side and being provided in the suction joint; and
a mechanism in the low pressure passage configured to reduce pressure pulsation, wherein the pressure pulsation reduction mechanism is communicated with an auxiliary chamber in which the volume thereof is increased or reduced by the plunger that is reciprocatingly moved by being guided by the cylinder, and the plunger includes, on a side opposite from the pressurizing chamber, a small diameter portion having a diameter smaller than that of a large diameter portion, which is guided by the cylinder, the auxiliary chamber presenting a volume change that is contrary to a volume change of the pressurizing chamber through reciprocating movement of the plunger is formed around the small diameter portion of the plunge, and the auxiliary chamber is connected to the low pressure passage,
a hole formed in the electromagnetic suction valve, and a suction valve biasing spring biasing the electromagnetic suction valve are provided inside the pump main body, an upstream side and a downstream side of the backflow suppression mechanism communicate with each other only through a passage provided with the backflow suppression mechanism.

2. The high pressure fuel supply pump according to claim 1, comprising a check valve or reed valve as the backflow suppression mechanism for suppressing backflow of fuel from the fuel suction port to the low pressure pipe.

3. The high pressure fuel supply pump according to claim 1, wherein
the fuel sucked to the high pressure fuel supply pump from the fuel suction joint through the backflow suppression mechanism flows into a damper chamber of the pressure pulsation reduction mechanism before flowing into the auxiliary chamber.

4. The high pressure fuel supply pump according to claim 1, wherein
the fuel sucked to the high pressure fuel supply pump from the fuel suction joint through the backflow suppression mechanism flows into the auxiliary chamber before flowing into a damper chamber of the pressure pulsation reduction mechanism.

5. The high pressure fuel supply pump according to claim 1, wherein
the electromagnetic suction valve includes a hole of predetermined size through which a predetermined amount of fuel can flow back from the fuel suction port to the low pressure pipe.

6. The high pressure fuel supply pump according to claim 2, wherein
the backflow suppression mechanism includes a valve seat and a valve for contacting with the valve seat, and
the valve seat is surface-roughened so that a small amount of fuel can flow back from the fuel suction port to the low-pressure pipe.

7. The high pressure fuel supply pump according to claim 1, wherein
the backflow suppression mechanism includes a valve seat and a valve for contacting with the valve seat, and
and valve includes a hole predetermined size through which a predetermined amount of flow can flow back from the fuel suction port to the low-pressure pipe.

8. The high pressure fuel supply pump according to claim 1, comprising
a suction joint, which is an inlet for introducing a fuel to a pump main body, wherein
the backflow suppression mechanism is arranged in the suction joint.

9. The high pressure fuel supply pump according to claim 1, wherein
a compression stroke where the plunger moved upward toward the pressurizing chamber consists of a return stroke where the electromagnetic suction valve is brought into an opened state to return a fuel to the low-pressure passage side and a discharge stroke where the electromagnetic suction valve is brought into a close state to discharge a fuel through the discharge valve.

10. The high pressure fuel supply pump according to claim 1, wherein the fuel flows directly from the auxiliary chamber to: i) the pressure pulsation reduction mechanism, and ii) a pressure pulsation propagation prevention mechanism.

* * * * *